(12) United States Patent
Lichtenstein

(10) Patent No.: US 7,628,603 B2
(45) Date of Patent: Dec. 8, 2009

(54) MAKING PASTRY SHELLS

(76) Inventor: David M. Lichtenstein, 10285 Glenoaks Blvd., Unit 4, Pacoima, CA (US) 91331

( * ) Notice: Subject to any disclaimer, the term of this patent is extended or adjusted under 35 U.S.C. 154(b) by 683 days.

(21) Appl. No.: 11/343,023

(22) Filed: Jan. 30, 2006

(65) Prior Publication Data

US 2007/0178198 A1    Aug. 2, 2007

(51) Int. Cl.
B29C 43/02    (2006.01)
A21C 11/00    (2006.01)

(52) U.S. Cl. .................. 425/388; 425/395; 425/403; 425/437; 426/512

(58) Field of Classification Search ............ 425/363, 425/364 R, 388, 394–395, 403, 437; 426/502, 426/512
See application file for complete search history.

(56) References Cited

U.S. PATENT DOCUMENTS

| | | |
|---|---|---|
| 2,774,316 A | 12/1956 | Daino |
| 3,375,791 A | 4/1968 | Pakula |
| 3,669,605 A | 6/1972 | Reilly |
| 4,271,200 A | 6/1981 | Hempenius et al. |
| 4,303,677 A | 12/1981 | De Acetis |
| 4,511,324 A | 4/1985 | Bauer |
| 4,973,240 A | 11/1990 | Reilly |
| 5,137,745 A | 8/1992 | Zukerman et al. |
| 5,667,821 A | 9/1997 | Castaneda |
| 5,716,658 A | 2/1998 | Donnelly et al. |
| 5,919,508 A * | 7/1999 | Donnelly et al. ............ 426/512 |
| 6,010,325 A * | 1/2000 | Lawrence ............... 425/364 R |
| 6,026,737 A * | 2/2000 | D'Alterio et al. ........... 425/394 |
| 6,194,017 B1 | 2/2001 | Woodward et al. |
| 6,205,914 B1 | 3/2001 | McCarney |
| 6,214,399 B1 | 4/2001 | Garbo |
| 6,240,836 B1 | 6/2001 | Garbo |
| 6,443,054 B1 | 9/2002 | McCarney |

FOREIGN PATENT DOCUMENTS

| | | |
|---|---|---|
| EP | 0516428 A | 12/1992 |
| GB | 185951 | 9/1922 |
| WO | WO 01/95729 A | 9/1922 |

* cited by examiner

*Primary Examiner*—Yogendra Gupta
*Assistant Examiner*—Thu Khanh T Nguyen
(74) *Attorney, Agent, or Firm*—Haynes & Boone, LLP

(57) ABSTRACT

Apparatus for making variously shaped pastry shells includes an annular baking ring supported on a horizontal lower plate to define an upward-facing female die. A gasket is disposed between the baking ring and the plate. An upper plate is positioned above and parallel to the lower plate, and includes a downward-facing male die configured to be inserted concentrically into the upper end of the female die and thereby define a die space having a flat floor and annular, vertical side walls between the dies. An annular collar is disposed concentrically about the male die and resiliently supported on the upper support plate such that, when the two plates are urged toward each other, the collar seals the upper and lower ends of the die space, and a volume of pastry dough disposed in the cavity of the female die is formed into a pastry shell conforming to the die space.

14 Claims, 8 Drawing Sheets

MAKING PASTRY SHELLS

TECHNICAL FIELD

This invention pertains to the culinary arts in general, and in particular, to methods and apparatus for the high speed, uniform quality, volume production of thin, rimless, open-topped, flat-bottomed, vertical-walled, pastry crusts or "shells" for baked dishes, such as pies, tarts, quiches and the like in a wide variety of plan form sizes and shapes.

BACKGROUND

Baked dishes incorporating pastry crusts or shells underlying, and some cases, completely surrounding, fillings of various types, are very popular and have been known since ancient times. Pastry crusts typically comprise a powdered flour, e.g., wheat or graham flour, mixed with eggs and an animal or vegetable fat, e.g., lard, butter, or margarine, to form a viscous ball that is rolled out into a flat sheet, wrapped around a filling of some type, and then baked, both to cook the dough and filling, and to impart a measure of structural rigidity to the resulting confection. Because even a baked crust or shell lacks any inherent strength or rigidity, many pastry dishes, such as pies, tarts, tartlets, and quiches are prepared for baking in open topped baking pans or dishes, into which the rolled sheet of pastry dough is first laid and then conformingly pressed by hand, with any excess material, or "scrap," being trimmed away at the upper margin of the pan with a knife, again, typically by hand.

In light of the foregoing, relatively labor-intensive processes involved in the production of pastry shells, some efforts have been made by restaurant and commercial bakery equipment makers to develop semi-automated methods and apparatus for producing pastry shells at a relatively greater speed and in a higher volume. Examples of these may be found in the patent literature in, e.g., U.S. Pat. Nos. 3,669,605 and 4,973,240 to A. J. Reilly, and involve a hydraulic press mounting one or more pairs of frustoconical dies and operative to conformingly press pre-measured volumes of pastry dough into conventional circular pie pans having a rim, closed bottoms and continuous, tapering, or upwardly flaring, side walls.

While such prior art efforts have met with some success, they are not without certain limitations. Among these is that they employ the conventional baking pans described above as female dies. Such pans are typically stamped or drawn from a flat sheet of a ductile metal to incorporate a closed bottom, or floor. Since such processes are incapable of producing relatively sharp bends and corners, i.e., 90° or less, they result in baking pans, and hence, pastry shells, with broadly tapered sidewalls that are either circular, or which intersect each other and the floor of the pan or crust at relatively large radii. However, for both cosmetic and product presentation reasons, and for reasons of storage and shipping efficiency, it is desirable to make rimless, open-topped pastry shells having a floor and continuous, substantially vertical side walls that can intersect each other and the floor of the pan at relatively sharp corners, in a wide variety of more complex ornamental plan form shapes, such as squares, crosses, triangles and the like, thus necessitating baking pans having a corresponding floor and corresponding continuous vertical curvilinear and/or polygonal sidewalls that intersect each other and the floor of the pan at relatively sharp corners.

BRIEF SUMMARY

In accordance with the present invention, methods and apparatus are presented that overcome the above limitations of the prior art and thereby enable the semiautomatic, high-speed, large-volume production of uniform-quality, rimless, open-topped pastry shells having a flat floor and thin, continuous, vertical side walls that intersect each other and the floor of the shell at relatively sharp corners, and in a wide variety of sizes and complex ornamental plan form shapes.

In one exemplary embodiment thereof, the apparatus of the invention comprises an annular "baking ring" having one or more continuous vertical side walls and opposite upper and lower ends that are open and substantially parallel to each other. Advantageously, the baking ring can be inexpensively manufactured by cutting a length of an annular extrusion, e.g., of an aluminum alloy, having the desired cross-sectional plan form, and then grinding it between the parallel plates of a centerless grinder until it reaches the desired axial length and its two opposite ends are substantially parallel to each other. Because the baking ring is extruded and has an open bottom, the side walls of the ring, and hence, the pastry shells formed therein, can be made substantially vertical, can incorporate relatively sharp corners at wall and floor intersections, and can take on a wide variety of complex ornamental cross-sectional plan form shapes, including curvilinear and/or polygonal shapes, such as circular, rectangular, square, star, heart-shaped, and the like.

The baking ring is supported in a press on the horizontal upper surface of a lower support plate, and means are provided, such as a recess in the upper surface, for locating the baking ring at a selected position on the plate, such that the baking ring and the lower support plate together define an upward-facing female die having a flat, horizontal floor and vertical interior side wall surfaces that intersect the floor at a right angle. A gasket, such as a sheet of an inexpensive, commercially available baking paper, is disposed between the lower end of the baking ring and the upper surface of the lower support plate.

The apparatus further includes an upper support plate having a horizontal lower surface that is disposed above and parallel to the upper surface of the lower support plate. A male die is mounted at a selected position on the lower surface of the upper plate to extend vertically downward from it. The male die has a lower face and vertical exterior side walls that are respectively complementary to the floor and interior side walls of the baking ring, and is arranged and configured to be inserted downward and concentrically into the female die in a complementary clearance fit that defines an annular die space having a generally flat, horizontal floor and continuous, substantially vertical sidewalls that intersect the floor at a right angle, between the two dies. Positioning means, such as a pair of vertical tooling pins and corresponding tooling holes respectively extending from and formed in the two support plates, are provided for positioning the upper and lower support plates relative to each other such that, when the two plates are urged toward each other with a press, the male die is inserted concentrically into the baking ring female die through its upper end.

An annular sealing collar is disposed concentrically about the male die and resiliently supported on the lower surface of the upper support plate such that, when the upper and lower support plates are urged toward each other, the collar sealingly engages the upper end of the baking ring, and simultaneously, sealingly compresses the gasket between the lower end of the baking ring and the upper surface of the lower support plate, thereby closing off both the upper and lower ends of the die space defined between the dies. The apparatus includes means, such as a conventional hydraulic press, for controllably urging the upper and lower support plates toward each other, such that a measured volume of deformable pastry dough disposed between the male and female dies before they are brought together, is formed into a rimless pastry shell having a floor and side walls substantially conforming to the die space.

In an exemplary preferred embodiment, means are provided for introducing a pressurized gas between a central region of the lower face of the male die and the formed pastry shell, thereby enabling the formed pastry shell to be easily separated from the male die when the dies are retracted from each other. Additionally, a plurality of sharpened pins can extend downward from a central region of the lower face of the male die, and a plurality of corresponding recesses can be provided in the upper surface of the lower plate. The pins and corresponding recesses can be arranged such that, when the upper and lower support plates are urged toward each other, the pins penetrate through the gasket and the floor of the pastry shell, and are received in respective ones of the recesses, thereby forming a plurality of vent holes in the floor of the shell. The vent holes prevent the floor of the shell from buckling up destructively during baking of the shell.

In an alternative, batch-production embodiment of the apparatus, the lower support plate can include a plurality of the upward-facing female dies, each defined by a respective one of the baking rings, and the upper support plate can include a plurality of corresponding downward-extending male dies that are respectively arranged such that, when the two plates are urged toward each other by the press, respective ones of the male dies are inserted concentrically within corresponding ones of the female dies. In the use of this embodiment, a selected volume of raw pastry dough is loaded into each of the upwardly facing female dies of the lower support plate, and the upper and lower support plates are then urged toward each other with a press such that the respective charges of dough in each of the female dies are, in a single stroke of the press, simultaneously formed into a corresponding plurality pastry shells, each having a floor and vertical side walls intersecting the floor at a right angle, conforming to the respective die space defined between the corresponding pair of male and female dies.

A better understanding of the above and many other features and advantages of the apparatus of the present invention and the methods of its use may be obtained from a consideration of the detailed description of the exemplary embodiments thereof below, particularly if such consideration is made in conjunction with the appended drawings, wherein like reference numerals are used to identify like elements illustrated in one or more of the figures thereof.

BRIEF DESCRIPTION OF THE DRAWINGS

FIGS. 13A-10J are top plan views of exemplary annular baking rings usable with the apparatus of the present invention to form variously shaped pastry shells; and, FIGS. 14A and 14B are top plan views of exemplary round tart presentations formed by combining a plurality of wedge- and teardrop-shaped tartlet shells, respectively.

DETAILED DESCRIPTION

Figure 1:
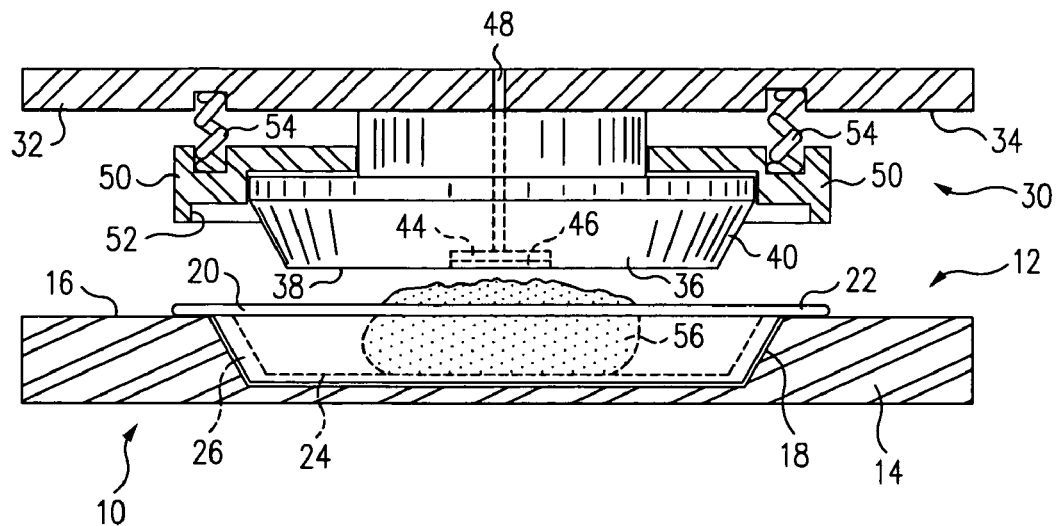
FIG. 1 is a partial cross-sectional elevation view of a prior art apparatus for making pastry shells, showing an upper, frustoconical male die portion spaced above and aligned with a lower, frustoconical female die portion comprising a conventional, closed-bottom baking pan, and wherein a hydraulic press used to urge the lower portion of the apparatus toward the upper portion is omitted for clarity.
Figure 2:
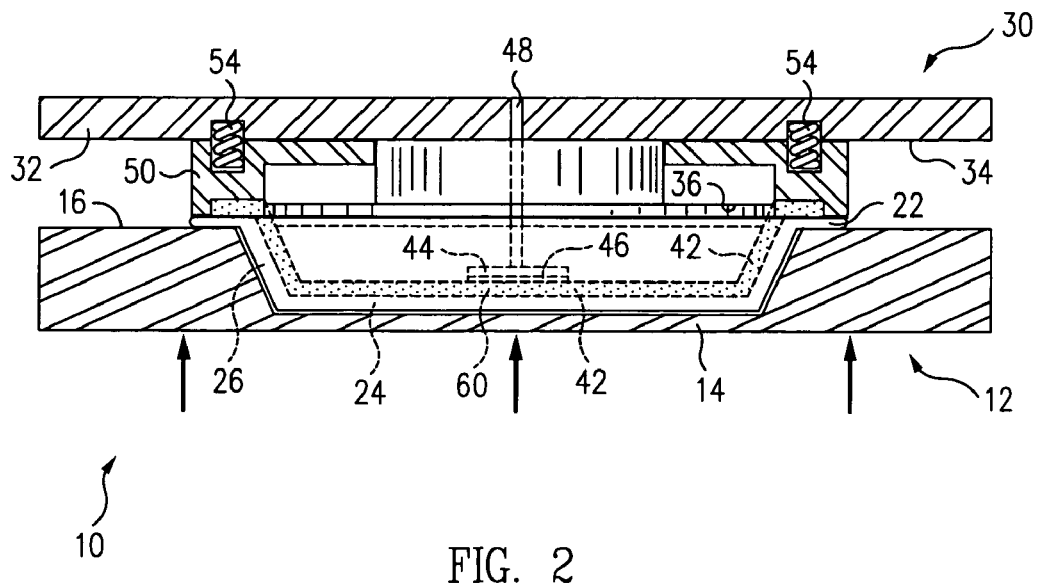
FIG. 2 is a partial cross-sectional elevation view of the prior art apparatus of FIG. 1, showing the lower portion being urged against the upper portion to form a conventional pastry shell.
Figure 3:
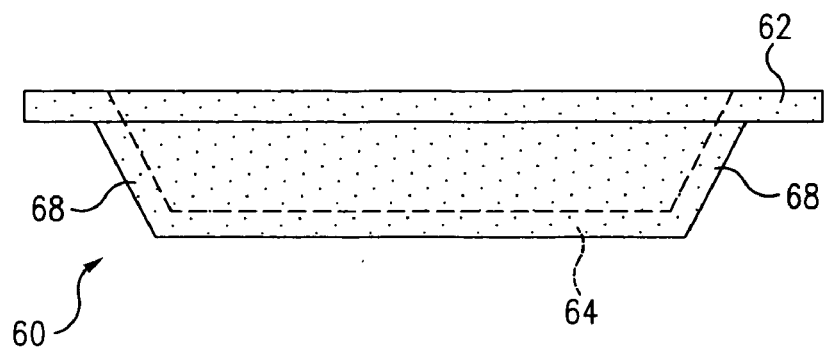
FIG. 3 is an elevation view of the conventional pastry shell produced by the prior art apparatus of FIGS. 1 and 2.
Figure 4:
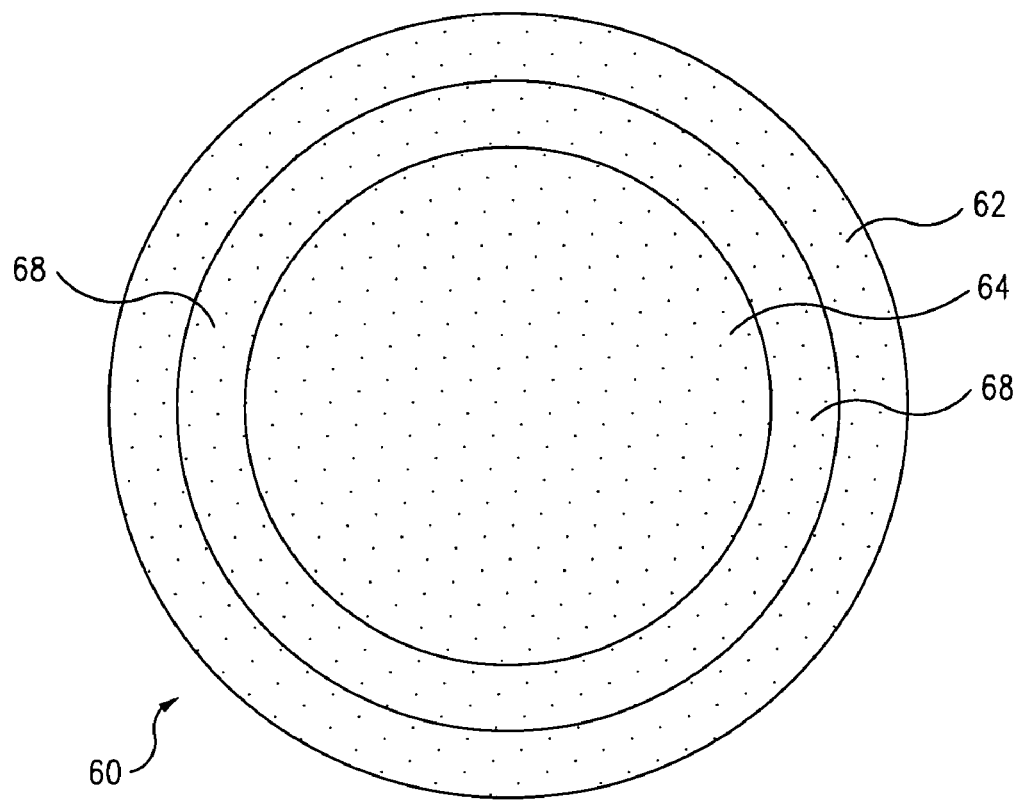
FIG. 4 is a top plan view of the conventional pastry shell of FIG. 3.

A prior art apparatus 10 for making pastry shells is illustrated in the partial cross-sectional elevation views of FIGS. 1 and 2. As shown in the figures, the prior art apparatus is seen to comprise two portions, a lower, female die portion 12 and an upper, male die portion 30. A conventional hydraulic press, used to urge the two portions together in a controllable manner to form the conventional pastry crust or shell 60 illustrated in the respective elevation and plan views of FIGS. 3 and 4, is omitted from the figures for clarity.

The lower, female die portion 12 of the prior art apparatus 10 comprises a lower support plate 14 having a horizontal upper surface 16 containing a recess 18 in which a conventional rimmed, frustoconical baking pan 20 is retained. As may be seen in the figures, the conventional baking pan includes a rim 22, a flat, closed floor or bottom 24, and upwardly flaring, or tapering, side walls 26.

The upper, male die portion 30 of the apparatus 10 comprises an upper support plate 32 having a horizontal lower surface 34 upon which a downwardly depending, frustoconical male die 36 is supported. The lower portion of the male die includes a flat lower face 38 and tapered side walls 40 that are respectively complementary to the floor 24 and tapered interior side walls 26 of the baking pan 20, and is configured to be inserted downward and concentrically into the female die of the baking pan in a complementary clearance fit between the two that defines a corresponding annular die space 42 having a flat floor and continuous, tapering sidewalls between the two dies. The lower face of the male die includes a cavity 44 closed by a flush, disk-shaped spring valve 46. When a pressurized gas, e.g., air, is introduced into the cavity through a bore 48 extending though the die, the disk valve is forced open, and the pressurized gas escaping through the valve acts to separate the die from a viscous, molded pastry shell formed thereon.

An annular sealing collar 50 containing a rim-molding recess 52 is disposed concentrically about the male die 36 and resiliently supported, e.g., by a plurality of springs 54, on the upper support plate 32. When the upper and lower die portions 30 and 12 are urged toward each other by the press, as indicated by the arrows in FIG. 2, the a peripheral margin of the lower face of the collar contacts the rim 22 of the baking pan 20 and forms both a seal and a rim-mold at the upper end of the die space 42. The pressure exerted by the male die and baking pan upon a measured volume of deformable pastry dough 56 disposed between the two dies forms the dough into a conventional pastry or pie shell 60 of the type illustrated in FIGS. 3 and 4, having a rim 62, a flat floor 64 and upward-flaring side walls 68 that conform to the die space 42 between the two dies of the apparatus 10.

As discussed above, one of the limitations of the prior art apparatus 10 is that it relies on the conventional closed-bottom baking pans 20 of the type illustrated and described above as the female die. Such pans are typically stamped or drawn from a flat sheet of a thin, ductile metal, and for manufacturability reasons, e.g., to prevent local oil-canning, warping and pleating effects, are incapable of incorporating relatively "sharp" bends or corners, i.e., those approaching 90° or even less, between wall sections of the pan, or between the walls 26 and the floor 24 of the pan, and therefore result in baking pans, and hence, pastry crusts, with broadly upward-flaring side walls that are either circular, or which comprise straight segments that intersect each other and the floor of the pan at relatively large radii, such as those shown in the conventional pastry crust 60 illustrated in FIGS. 3 and 4.

However, a novel method and apparatus have been discovered that involve the use of inexpensive, annular, open-bottomed baking "rings" instead of pans, which have continuous, substantially vertical sidewalls, and which can therefore easily incorporate curvilinear and/or polygonal wall segments that can intersect each other and the bottom, or floor, of the shell at relatively sharp i.e., 90° or less, angles, and accordingly, is capable of producing corresponding rimless, open-topped pastry shells with a floor and continuous, substantially vertical side walls that can have a wide variety of complex ornamental plan form shapes, such as squares, triangles, ellipses, and the like.

Figure 5:
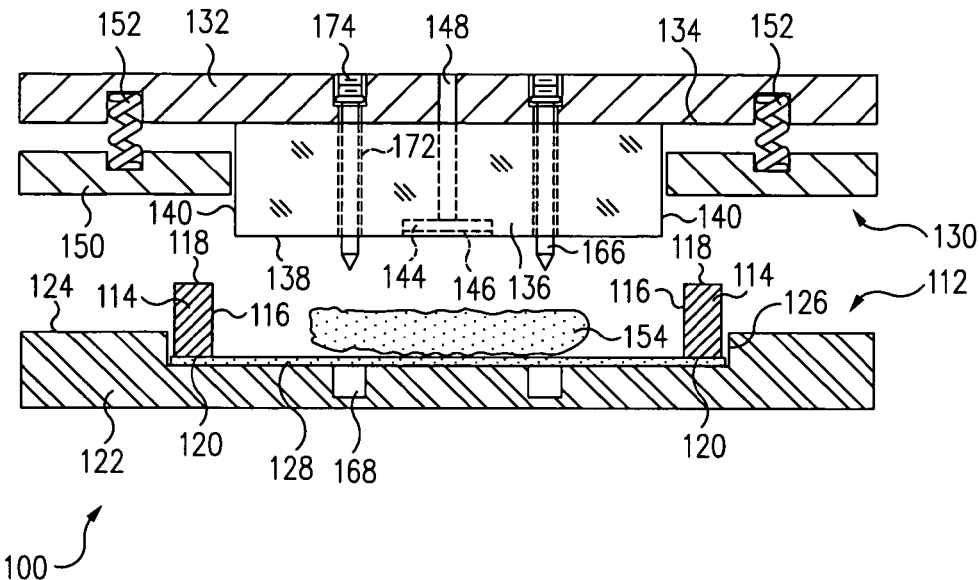
FIG. 5 is a partial cross-sectional elevation view of an exemplary embodiment of an apparatus for making pastry shells in accordance with the present invention, showing an upper, male die portion spaced above and aligned with a lower, female die portion comprising an annular, open-ended baking ring of the present invention, and wherein a hydraulic press used to urge the lower portion of the apparatus toward the upper portion is omitted for clarity.
Figure 6:
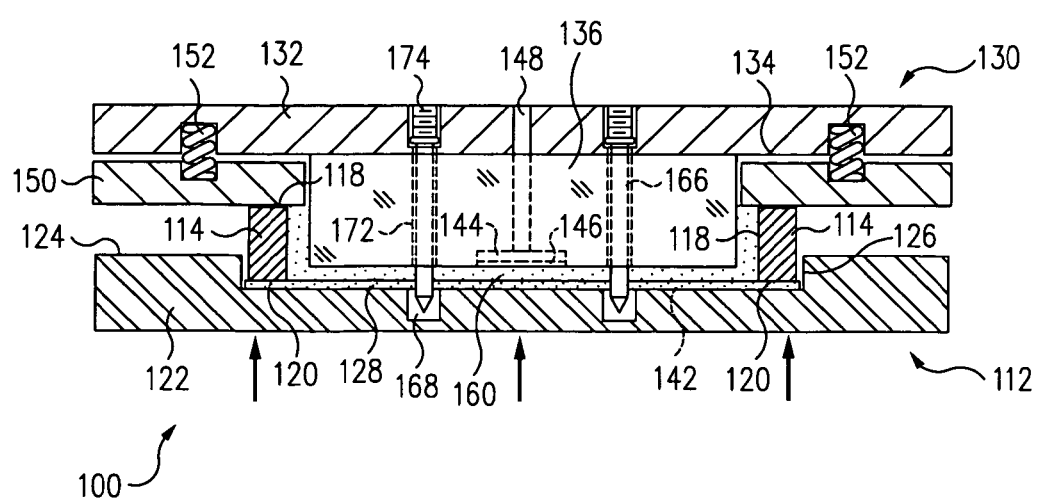
FIG. 6 is a partial cross-sectional elevation view of the exemplary apparatus of FIG. 5, showing the lower portion being urged against the upper portion to form a pastry shell in accordance with the present invention.

An exemplary embodiment of an apparatus 100 for making pastry shells in accordance with the present invention is illustrated in the partial cross-sectional elevation views FIGS. 5 and 6. Similar to the prior art apparatus 10 described above, the novel apparatus 100 comprises two portions, viz., a lower, female-die portion 112, and an upper, male-die portion 130. As in the above discussion and related illustrations, a conventional hydraulic press, used to controllably urge the two portions together in the formation of a pastry shell, is omitted from the figures for clarity.

As illustrated in the figures, the lower, female die portion 112 of the exemplary embodiment 100 comprises an annular baking ring 114 having one or more vertical interior side walls 116, and opposite upper and lower ends 118, 120 that are both open and substantially parallel to each other. In one possible method for their manufacture, the reusable baking rings can be produced in large quantities simply and inexpensively by the provision of an extrusion die having an annular cross-sectional plan form shape corresponding to the desired annular cross-sectional plan form shape of the baking ring, then forming an elongated extrusion of, e.g., an aluminum alloy, with the die, cutting axial sections from the extrusion, and grinding the sections between the parallel plates of a centerless grinder until the sections each have the desired finished axial length, and opposite first and second ends that are substantially parallel to each other, as described above. The wall thickness of the rings can vary, depending on, among other things, the material of which they are made and the size of the pastry shells being formed thereby, for an exemplary tartlet shell made of an extruded aluminum and having a characteristic width of about 4.5-6 inches, the side walls of the ring can have a thickness of about 0.22 inches. Additionally, the rings can be made of a wide variety of materials, including metals, thermoplastics, ceramics, and ceramic plastics that can withstand ordinary baking temperatures and repeated washings in, e.g., a conventional dishwasher Because the baking ring 114 is extruded and has an open bottom, the side walls 116 of the ring, and hence, a pastry shell formed therein, can be made substantially vertical, can incorporate relatively sharp corners at wall and floor intersections, and can easily be made in a wide variety of sizes and complex ornamental plan form shapes, including curvilinear and/or polygonal shapes, such as rectangular, square, triangular, multi-pointed stars, crescent "moons" and the like, by the extruding method described above. Additionally, if desired, the exterior surface of the baking ring, or at least the interior side wall surfaces that come into contact with pastry dough, can be coated with a non-stick, wear-resistant coating, e.g., polytetrafluoroethylene ("PTFE") or an oxide of aluminum, for ease of baking and cleanup.

The baking ring 114 is supported on a lower support plate 122 that has a flat, horizontal upper surface 124, and means, such as a recess 126 having a shape complementary to the ring, or a plurality of upstanding locating pins (not illustrated), for locating the baking ring at a selected position on the upper surface, such that the baking ring and the lower support plate cooperate to define an upward-facing female die having a flat, horizontal floor, and continuous, vertical sidewalls that intersect each other and the floor perpendicularly, i.e., at a sharp, 90° angle. A thin gasket 128, such as a sheet of inexpensive and widely available baking paper, is disposed between the lower end of the baking ring and the upper surface of the lower support plate. Advantageously, the paper which can accompany a shell formed thereon through the baking process, can be coated with an FDA-approved, non-stick, water- and grease-resistant coating, such as Quilon, for both ease of separation of the baked shell from the paper and for hygienic reasons.

The upper, male die portion 130 of the apparatus 100 comprises an upper support plate 132 having a horizontal lower surface 134 disposed above and parallel to the upper surface 124 of the lower support plate 122. A male die 136 having a lower face 138 and substantially vertical exterior side walls 140 that are respectively complementary to the floor of the female die and the interior side walls 116 of the baking ring 114 extends downward from the lower surface of the upper support plate. The male die is configured to be inserted concentrically downward into the female die defined by the baking ring and lower plate with a complementary clearance fit that defines a die space 142 having a flat, horizontal floor, and continuous vertical sidewalls between the two opposing dies when they are in engagement, as illustrated in FIG. 6.

Means (not illustrated) are provided in the two support plates 122 and 132 for locating the male die 136 at a selected position on the lower surface 134 of the upper support plate 132, as well as means (not illustrated) for positioning the upper and lower support plates relative to each other such that, when the two plates are urged toward each other, e.g., in a press, the male die is inserted concentrically downward into the female die. The former, male-die-locating means can comprise, for example, a recess or a plurality of locating pins or fasteners in the lower surface of the upper plate, in an arrangement similar to the locating means 126 for the baking ring 114 on the lower support plate, and the latter, plate-positioning means can comprise, for example, corresponding pairs of vertical tooling pins and holes respectively extending from and formed in the two support plates, as illustrated in the exemplary embodiment of FIGS. 9-12 described below.

As in the prior art apparatus 10 described above, the lower face 138 of the male die 136 can be provided with a pressurized gas cavity 144 closed by a flush, disk-shaped spring valve 146. Pressurized gas, such as air or dry nitrogen, introduced into the cavity through a bore 148, forces the disk valve to open when pressure between the two die portions is removed, i.e., when the two die portions are retracted from each other, and the pressurized gas escaping through the valve acts, as described above, as a mold-releasing mechanism, i.e., to separate the male die from a viscous, molded pastry shell formed thereon.

A close-fitting, annular sealing collar 150 is disposed concentrically about the male die 136, and is resiliently supported, e.g., by a plurality of springs 152, on the lower surface 134 of the upper support plate 132 such that, when the upper and lower support plates 132, 122 are urged toward each other by the press, as illustrated in FIG. 6, the collar simultaneously sealingly engages the upper end 118 of the baking ring 114 and sealingly compresses the gasket sheet 128 between the lower end 120 of the baking ring and the upper surface 128 of the lower support plate, thereby closing off both the upper and lower ends of the die space 142 to prevent the escape of dough during the power stroke of the press. Those of skill in the art will appreciate that it is desirable to minimize the annular clearance between the collar and the die, or otherwise provide a sliding seal arrangement therebetween, and further, to arrange the vertical position of the collar relative to the male die such that the above two seals are effected on the die space before the dough being compressed in the dies reaches them, to avoid the undesirable escape of the dough and the resulting formation of ugly "flash."

Figure 7:
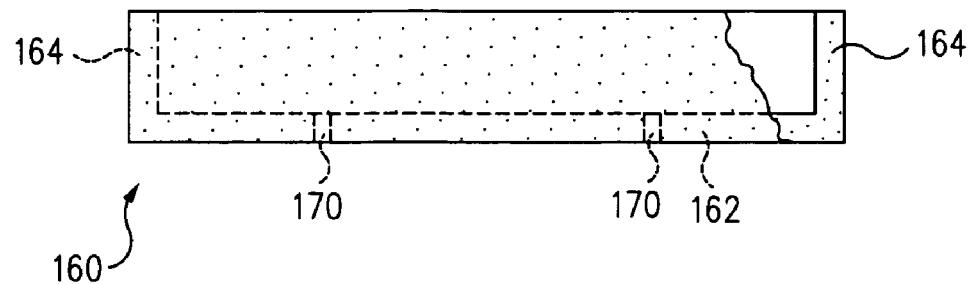
FIG. 7 is an elevation view of a novel pastry shell having a square plan form and produced by the exemplary apparatus of FIGS. 5 and 6.
Figure 8:
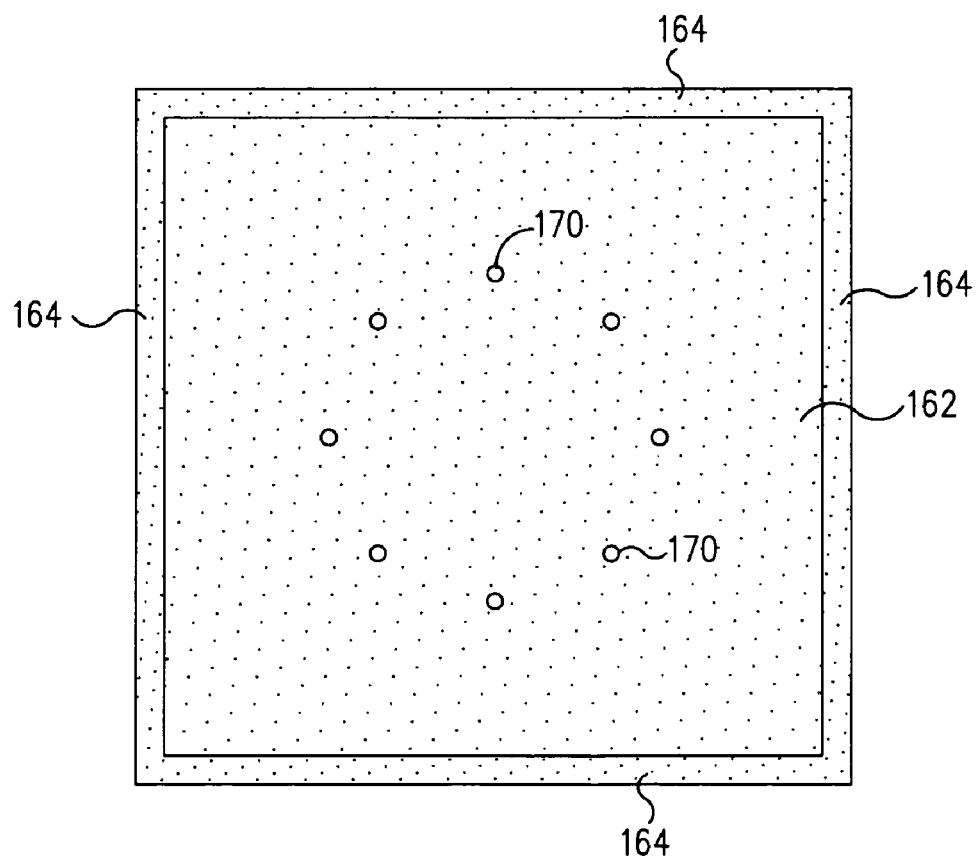
FIG. 8 is a top plan view of the novel pastry shell of FIG. 7.

In use, the apparatus 100 is disposed in a hydraulic press (not illustrated) in the configuration illustrated in FIG. 5, i.e., with the upper and lower die portions 130, 112 spaced apart from each other, and with a measured quantity of raw pastry dough 154 disposed in the cavity of the female die. The press is then actuated to urge the upper and lower support plates 132, 122 toward each other, as indicated by the arrows in FIG. 6, such that the dough is pressed into the die space 142 between the dies and thereby formed into a conforming, rimless, open-topped pastry shell 160 having a flat floor 162 and continuous, vertical side walls 164, as illustrated in FIGS. 7 and 8. It may be noted in the figures that each of the sidewalls of the shell joins the floor, and in the particular "square" embodiment illustrated in FIGS. 7 and 8, each other, at a substantially sharp right angle.

Figure 13A:
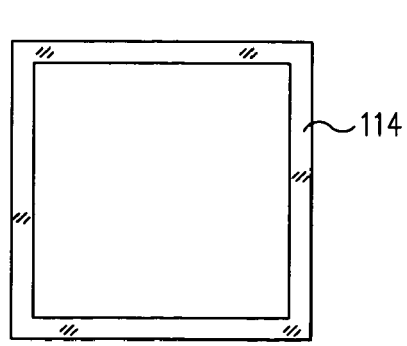
Figure 13B:
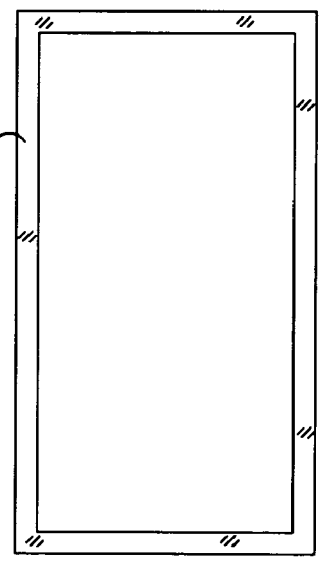
Figure 13C:
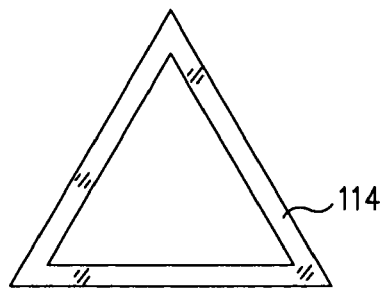
Figure 13D:
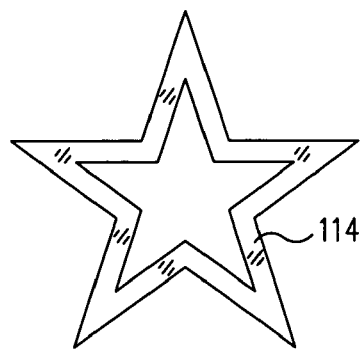
Figure 13E:
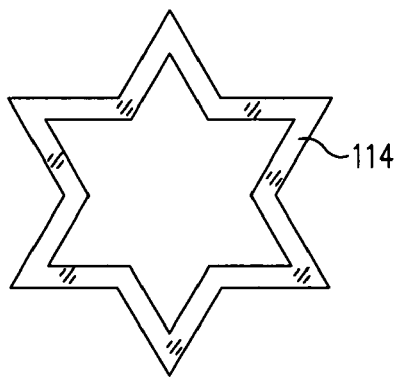
Figure 13F:
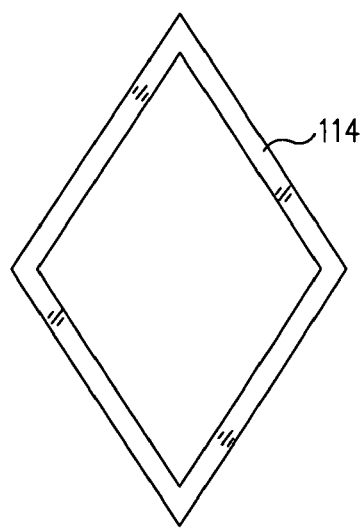
Figure 13G:
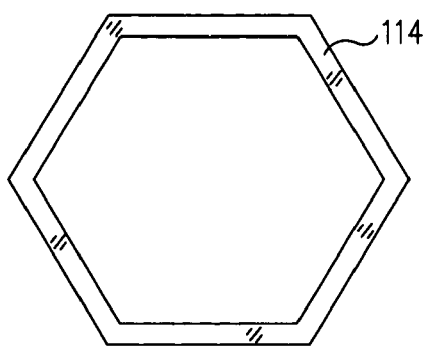
Figure 13H:
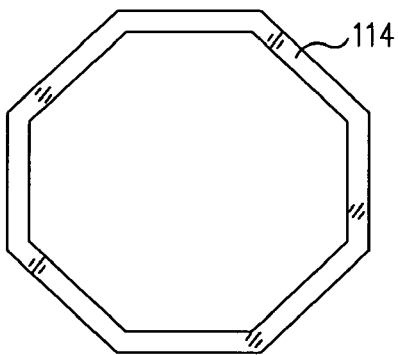
Figure 13I:
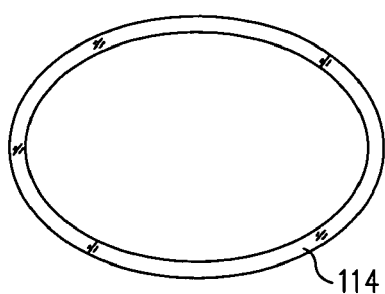
Figure 13J:
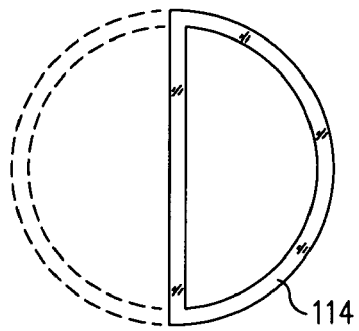

While the exemplary pastry shell 160 illustrated in FIGS. 7 and 8 is square in plan form, those of skill in this art will appreciate that many other sizes and ornamental plan form shapes of pastry shells can be produced with the exemplary apparatus 100 of the present invention by the simple expedient of varying the size and shape of the annular baking ring 114 and the corresponding, complementary male die 136 used in the apparatus. A number of exemplary embodiments of open-ended, extruded annular baking rings 114 having a variety of different, ornamental plan form shapes, and which may be used in accordance with the methods of the present invention, are respectively illustrated in the top plan views of FIGS. 13A-13J. It may be noted that in some of these embodiments, e.g., the triangular and diamond shaped plan form embodiments of FIGS. 13C and 13F, respectively, and the star-shaped plan form embodiments of FIGS. 13D and 13E, the wall segments of the baking rings, and hence, the side walls of the shells formed therein, can intersect each other at sharp corners that in some cases may include angles of less than 90°.

An additional advantageous feature of the exemplary apparatus 100 is illustrated in FIGS. 5-8, and includes a plurality of sharpened pins 166 that extend downward from a central region of the lower face 138 of the male die 136, together with a plurality of corresponding recesses 168 contained in the upper surface 124 of the lower support plate 122. The pins and recesses are arranged such that, when the upper and lower support plates 132, 122 are urged toward each other, the pins penetrate through the gasket 128 and the floor 162 of the pastry shell 160 formed between the dies, and are then received in respective ones of the recesses, thereby resulting in a plurality of vent holes 170 (see FIGS. 7 and 8) formed in the floor of the shell.

The vent holes 170 prevent the floor 162 of the shell 160 from buckling and arching up undesirably during baking of the shell as a result of the expansion of gases between floor of the shell and a surface on which the shell is baked, such as an oven shelf. In the prior art, vent holes are formed in the floor of a shell by hand, using, e.g., the tines of a fork. In the particular exemplary embodiment illustrated, the sharpened pins 166 are headed and retained in cylindrical bores 172 in the male die by threaded cap screws 174. However, in other possible embodiments, the pins may be retained in the male die by other retaining means, e.g., a simple shrink fit of the pins in the die.

Figure 9:
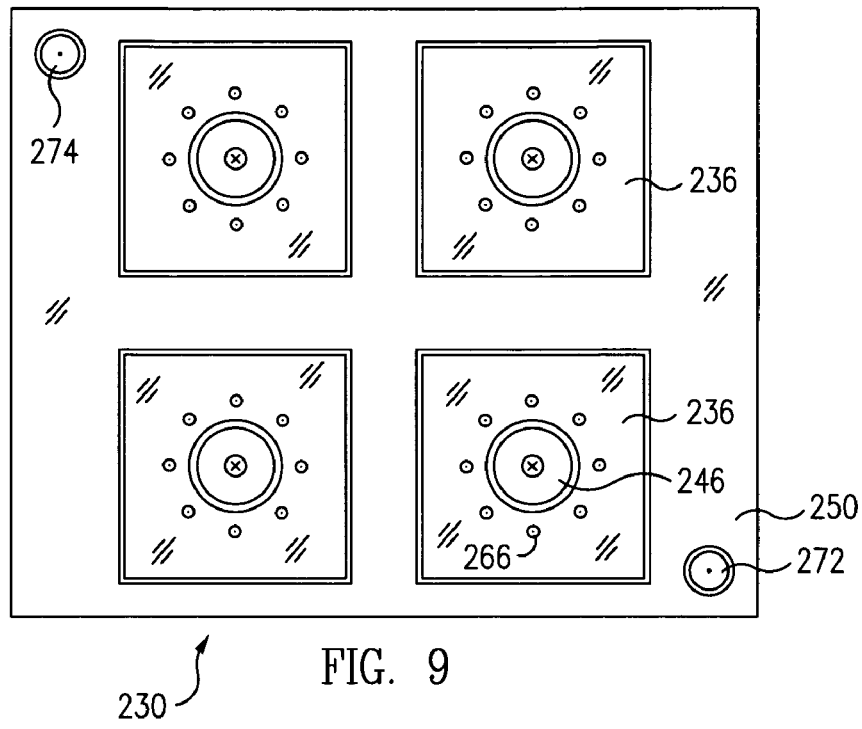
FIG. 9 is a bottom plan view of an upper, male die portion of an exemplary alternative embodiment of an apparatus for making a plurality of pastry shells simultaneously in accordance with the present invention.

A second exemplary embodiment of an apparatus 200 suitable for making a plurality of, e.g., square pastry shells simultaneously, i.e., in batches, is illustrated in FIGS. 9-12. FIG. 9 is a bottom plan view of an upper, male die portion 232 of the apparatus, and comprises an upper support plate 232 mounting a plurality, e.g., four, male dies 236, each of which is substantially similar in configuration and operational features to the single male die 136 illustrated in FIGS. 5 and 6, including a mold-releasing spring valve 246 and sharpened, downwardly depending, shell-venting pins 166.

Figure 10:
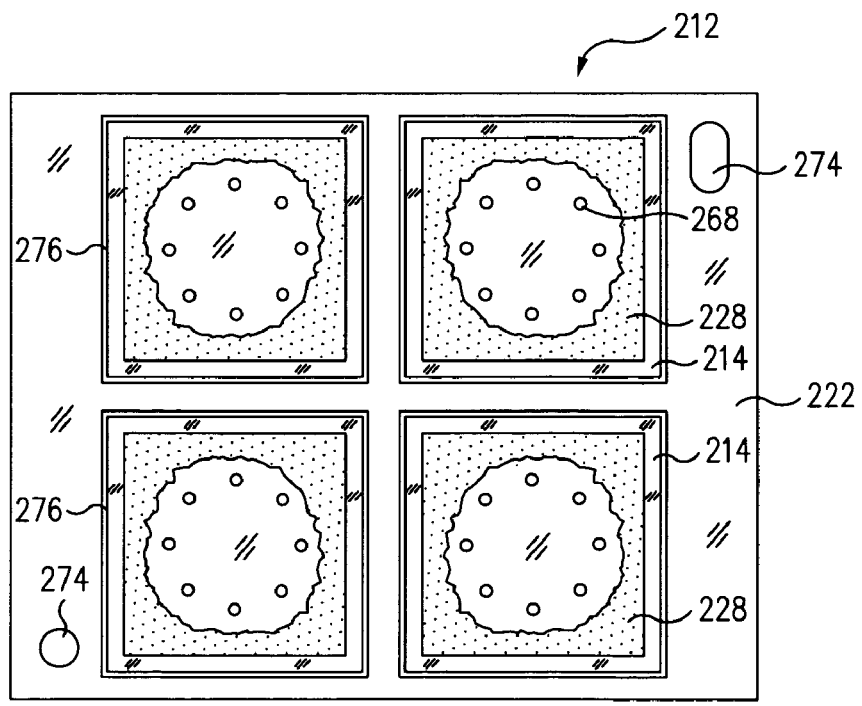
FIG. 10 is a top plan view of a lower, female die portion of the alternative embodiment of apparatus of FIG. 9.

FIG. 10 is a top plan view of a lower, female die portion 212 of the apparatus 200, comprising a support plate 222 mounting a plurality of corresponding, upward-facing female dies, each comprising a locating recess 226 in the upper surface 124 of the plate and a corresponding baking ring 214 disposed therein. A corresponding paper gasket 228 is disposed between the lower end of each of the corresponding baking rings and the upper surface of the lower support plate, and are shown in FIG. 9 with a center portion cut away to reveal the underlying venting-pin-receiving recesses 268 disposed in the upper surface of the lower support plate.

Figure 11:
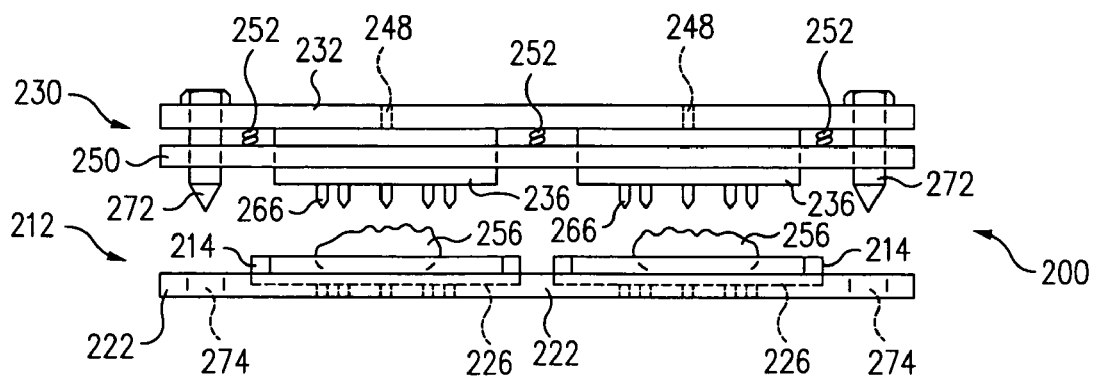
FIG. 11 is an elevation view of the alternative apparatus of FIGS. 9 and 10, showing the upper portion spaced above and in alignment with the lower portion.

FIG. 11 is a side elevation view of the two die portions, showing the upper die portion 232 disposed above and in alignment with the lower die portion 212, preparatory to being urged together by a press (not illustrated) to form a plurality of pastry shells between respective pairs of the dies. The upper and lower support plates 232, 222 each includes respective means for positioning the two plates relative to each other such that, when the two plates are urged together by the press, respective ones of the male dies are inserted concentrically downward into corresponding ones of the female dies. In the particular embodiment illustrated in FIGS. 9-12, these alignment means comprise a pair of vertical tooling pins 272 and corresponding tooling holes 274 respectively extending from and formed in the two plates. However, as those of skill in the art will appreciate, other alignment means can be used in place of those illustrated.

Figure 12:
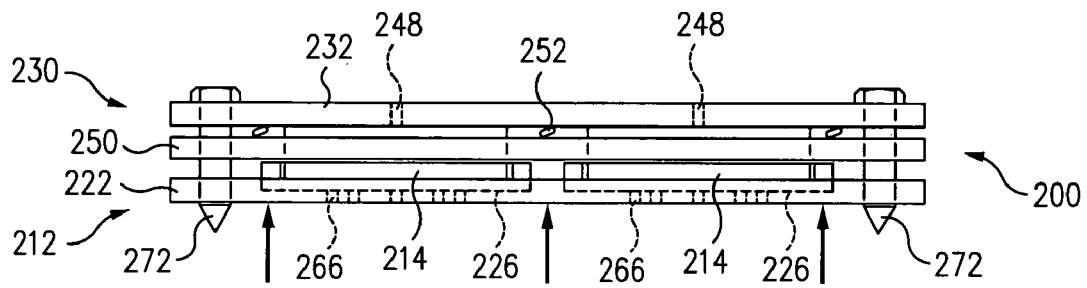
FIG. 12 is an elevation view of the alternative apparatus of FIGS. 9 and 10, showing the lower portion being urged against the upper portion to form a plurality of pastry shells simultaneously in accordance with the present invention

For use, the apparatus 200 is disposed in a hydraulic press (not illustrated) in the configuration illustrated in FIG. 11, with a measured volume of pastry dough 256 loaded in each of the cavities of the upward-facing female dies of the lower support plate 222. As illustrated in FIG. 12, the upper and lower support plates 222 and 232 are then urged toward each other with the press in the direction indicated by the arrows such that the pastry dough loaded in each of the female dies is formed into a pastry shell having a floor and continuous, vertical side walls conforming to the respective die space defined between the corresponding pair of male and female dies. The two die portions are then retracted away from each other, thereby enabling pressurized gas introduced into the respective gas chambers 244 of the male dies 236 to escape and separate the formed shells from the male dies, as in the exemplary embodiment 100 above. The individual shells, including their corresponding baking rings 214 and floor gaskets 228, are then removed from the lower support plate 222 for further processing, e.g., filling and baking.

By now, those of skill in this art will appreciate that many modifications, substitutions and variations can be made in and to the materials, apparatus, configurations and methods of the present invention without departing from its spirit and scope.

Figure 14A:
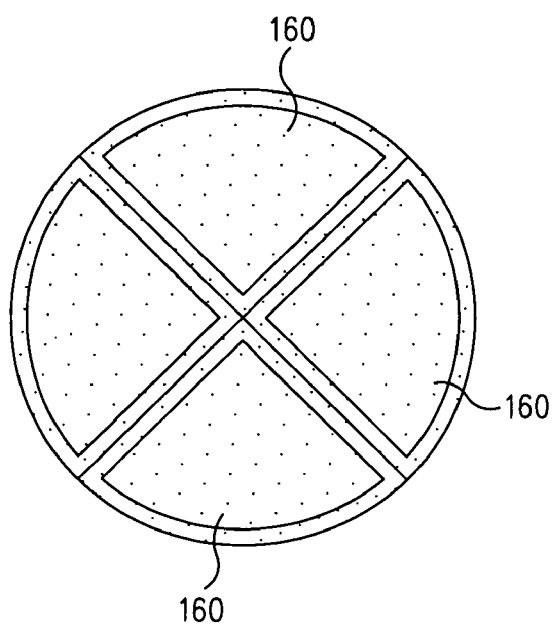
Figure 14B:
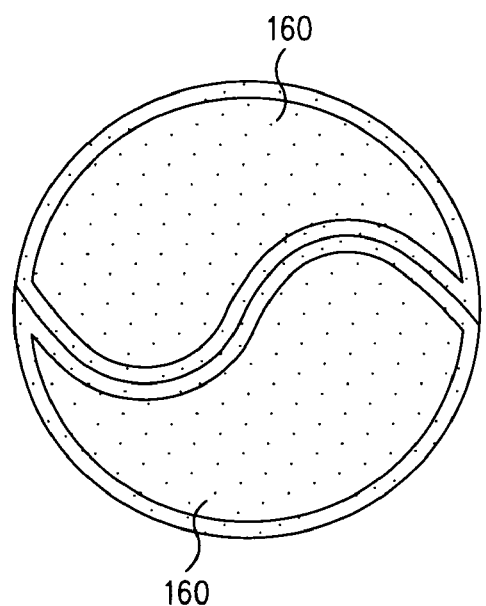

For example, a thermostatically controlled heating element can be incorporated into the upper, male die portion of the apparatus to maintain the male dies at a selected elevated temperature at which the lubricity and malleability of the pastry dough formed thereby is greatly enhanced. Similarly, it should be understood that the multiple-die apparatus 200 of FIGS. 9-12 can be used to make either a plurality of identical shells, or with appropriate modifications to the setup, a plurality of shells in which each shell is ornamentally different than the others formed along with it. For example, it is possible to form a plurality of identical, wedge-shaped shells 160, and after filling and baking, to assemble them for packaging and/or presentation in a conventional, but "pre-sliced," circular tart arrangement, as illustrated in FIG. 14A. Other interlocking and/or radially symmetrical shell plan form shapes having desirable ornamental, packaging and/or presentation features are also possible, such as the teardrop shells 160 of FIG. 14B.

Accordingly, the scope of the present invention should not be limited to that of the particular embodiments illustrated and described herein, as they are merely exemplary in nature, but rather, should be fully commensurate with that of the claims appended hereafter and their functional equivalents.

What is claimed is:

1. Apparatus for making unbaked pastry shells, comprising:

an annular baking ring having one or more vertical side walls and opposite upper and lower ends that are open and parallel to each other;

a lower support plate having a horizontal upper surface and means for locating the baking ring at a selected position on the upper surface such that the baking ring and the lower support plate together define an upward-facing female die having a flat, horizontal floor and vertical interior side wall surfaces that intersect the floor at a right angle;

a gasket disposed between the lower end of the baking ring and the upper surface of the lower support plate;

an upper support plate having a horizontal lower surface disposed above and parallel to the upper surface of the lower support plate;

a male die having a lower face and vertical exterior side wall surfaces that are respectively complementary to the floor and interior side wall surfaces of the female die extending downward from the lower surface of the upper support plate, the male die being arranged and configured to be inserted concentrically downward into the female die with a complementary clearance fit defining a die space between the two dies;

means for locating the male die at a selected position on the lower surface of the upper support plate;

means for positioning the upper and lower support plates relative to each other such that, when the two plates are urged toward each other, the male die is inserted concentrically into the female die;

an annular sealing collar disposed concentrically about the male die and resiliently supported on the lower surface of the upper support plate such that, when the upper and lower support plates are urged toward each other, the collar simultaneously sealingly engages the upper end of the baking ring and sealingly compresses the gasket between the lower end of the baking ring and the upper surface of the lower support plate; and, means for controllably urging the upper and lower support plates toward each other such that a selected volume of pastry dough disposed between the male and female dies is formed into an unbaked pastry shell having a floor and vertical side walls substantially conforming to the die space between the two dies, wherein the baking ring, the gasket and the unbaked pastry shell formed in the baking ring define an assembly that is laterally removable from the apparatus for a subsequent filling of the interior of the shell and a conjoint baking of the ring, the gasket the shell and the filling of the shell in a separate oven, and wherein the baking ring functions to support the unbaked pastry shell during the subsequent filling and baking thereof.

2. The apparatus of claim 1, further comprising means for introducing a pressurized gas between a central region of the lower face of the male die and the pastry shell and thereby separating the pastry shell from the die.

3. The apparatus of claim 1, further comprising a plurality of sharpened pins extending downward from a central region of the lower face of the male die, and a plurality of corresponding recesses contained in the upper surface of the lower plate, the pins and recesses being arranged such that, when the upper and lower support plates are urged toward each other, the pins penetrate through the gasket and the floor of the pastry shell and are received in corresponding ones of the recesses, thereby forming a plurality of vent holes through the floor of the pastry shell.

4. The apparatus of claim 1, wherein the baking ring comprises an extrusion.

5. The apparatus of claim 4, wherein the extrusion comprises an aluminum alloy.

6. The apparatus of claim 1, wherein a cross-sectional plan form shape of the side walls of the baking ring are curvilinear, polygonal, or both curvilinear and polygonal.

7. The apparatus of claim 1, further comprising a non-stick coating on at least an interior side wall surface of the baking ring.

8. The apparatus of claim 7, wherein the non-stick coating comprises polytetrafluoroethylene or an oxide of aluminum.

9. The apparatus of claim 1, wherein the gasket comprises baking paper.

10. The apparatus of claim 9, further comprising a non-stick, grease-resistant coating on the paper.

11. The apparatus of claim 1, wherein the means for locating the baking ring at a selected position on the upper surface of the lower support plate comprises a recess in the upper surface of the lower support plate.

12. The apparatus of claim 1, wherein the means for positioning the upper and lower support plates relative to each other comprises corresponding pairs of vertical tooling pins and tooling holes respectively extending from and formed in the two plates.

13. The apparatus of claim 1, wherein the means for controllably urging the upper and lower support plates toward each other comprises a hydraulic press.

14. The apparatus of claim 1, wherein:
the lower support plate includes a plurality of the upward-facing female dies;
the upper support plate includes a plurality of corresponding downward-facing male dies; and,
the upper and lower support plates include respective means for locating the respective dies relative to the respective plates, and for positioning the two plates relative to each other such that, when the two plates are urged toward each other, respective ones of the male dies are inserted concentrically downward into corresponding ones of the female dies.

* * * * *